United States Patent
Chen (10) Patent No.: US 9,515,550 B2
(45) Date of Patent: Dec. 6, 2016

(54) INDUCTOR CURRENT ZERO-CROSSING DETECTION METHOD AND CIRCUIT AND SWITCHING POWER SUPPLY THEREOF

(71) Applicant: Silergy Semiconductor Technology (Hangzhou) LTD, Hangzhou, ZheJiang Province (CN)

(72) Inventor: Lei Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 94 days.

(21) Appl. No.: 14/564,815

(22) Filed: Dec. 9, 2014

(65) Prior Publication Data

US 2015/0180339 A1 Jun. 25, 2015

(30) Foreign Application Priority Data

Dec. 24, 2013 (CN) .......................... 2013 1 0721874

(51) Int. Cl.
*H02M 3/156* (2006.01)
*H02M 1/00* (2006.01)

(52) U.S. Cl.
CPC ..... *H02M 3/156* (2013.01); *H02M 2001/0058* (2013.01); *Y02B 70/1491* (2013.01)

(58) Field of Classification Search
CPC .... H02M 1/083; H02M 3/158; H02M 3/1588; H02M 2001/00558; G05F 1/614; G05F 1/59; G05F 1/562
USPC ................ 323/235, 268, 269, 271, 274, 319
See application file for complete search history.

(56) References Cited

U.S. PATENT DOCUMENTS

| | | | |
|---|---|---|---|
| 6,756,771 B1 | 6/2004 | Ball et al. | |
| 8,736,236 B2 | 5/2014 | Sun et al. | |
| 8,803,563 B2 | 8/2014 | Deng et al. | |
| 8,971,061 B2 | 3/2015 | Li | |
| 2008/0298106 A1* | 12/2008 | Tateishi | H02M 3/1588 363/127 |
| 2009/0323375 A1* | 12/2009 | Galvano | H02M 3/3376 363/21.06 |
| 2012/0092900 A1* | 4/2012 | Orr | H02M 1/4208 363/21.03 |
| 2013/0241461 A1 | 9/2013 | Huang | |
| 2013/0293135 A1* | 11/2013 | Hu | H05B 33/0815 315/224 |
| 2013/0300400 A1* | 11/2013 | Zhou | G01R 19/0046 324/76.71 |
| 2014/0009080 A1 | 1/2014 | Xu | |
| 2015/0214829 A1* | 7/2015 | Xu | H02M 1/083 363/21.03 |
| 2015/0381037 A1* | 12/2015 | Romeo | H02M 3/156 323/282 |

FOREIGN PATENT DOCUMENTS

CN 103166442 A 6/2013

* cited by examiner

*Primary Examiner* — Adolf Berhane
(74) *Attorney, Agent, or Firm* — Michael C. Stephens, Jr.

(57) ABSTRACT

In one embodiment, a method of detecting an inductor current zero-crossing in a switching power supply, can include: (i) determining a present output voltage of the switching power supply; (ii) generating a zero-crossing detection threshold voltage according to the output voltage; and (iii) generating a zero-crossing detection signal according to the zero-crossing detection threshold voltage, where the zero-crossing detection signal is used to turn off a synchronous rectifier switch in the switching power supply.

15 Claims, 7 Drawing Sheets

INDUCTOR CURRENT ZERO-CROSSING DETECTION METHOD AND CIRCUIT AND SWITCHING POWER SUPPLY THEREOF

RELATED APPLICATIONS

This application claims the benefit of Chinese Patent Application No. 201310721874.1, filed on Dec. 24, 2013, which is incorporated herein by reference in its entirety.

FIELD OF THE INVENTION

The present invention relates to the field of electronics, and more particularly to inductor current zero-crossing detection method and circuits, and an associated switching power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a method of detecting an inductor current zero-crossing in a switching power supply, can include: (i) determining a present output voltage of the switching power supply; (ii) generating a zero-crossing detection threshold voltage according to the output voltage; and (iii) generating a zero-crossing detection signal according to the zero-crossing detection threshold voltage, where the zero-crossing detection signal is used to turn off a synchronous rectifier switch in the switching power supply.

In one embodiment, an inductor current zero-crossing detection circuit configured in a switching power supply, can include: (i) an output voltage sampling circuit configured to determine a present output voltage of the switching power supply; (ii) a zero-crossing detection threshold voltage generating circuit configured to generate a zero-crossing detection threshold voltage according to the output voltage; and (iii) a zero-crossing detection circuit configured to generate a zero-crossing detection signal according to the zero-crossing detection threshold voltage, where the zero-crossing detection signal is used to turn off a synchronous rectifier switch in the switching power supply.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching power supply is a power supply that may be used to generate a stable output voltage by controlling a time ratio between an on time and off time of a power switch (e.g., a transistor). Zero-crossing detection of inductor current is an important factor in a switching power supply. In some cases, when the switching power supply is in a light-load mode or condition, a zero-crossing point may be leading or lagging, which can result in current intrusion without a self-adaptive zero-crossing detection circuit. This can affect system performance, and may reduce conversion efficiency. Also, such current intrusion may impact the power supply in a next cycle, possibly affecting overall reliability of the system.

Figure 1:
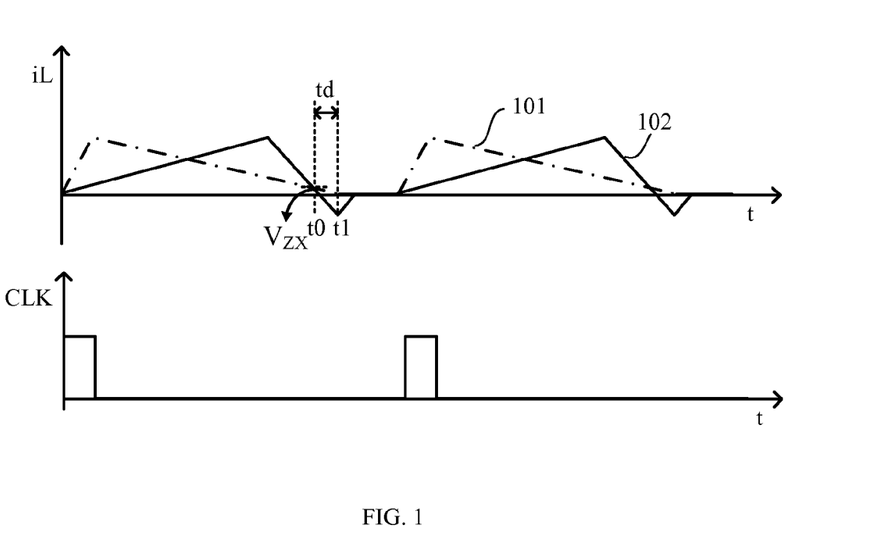
FIG. 1 is a diagram of example inductor currents that change over time in an example switching power supply.

Referring now to FIG. 1, shown is a diagram of example inductor currents that change over time in an example switching power supply. In some approaches, a zero-crossing comparator may be used to detect a zero-crossing point of an inductor current. In FIG. 1, when output voltage Vout is relatively small, the inductor current may be shown as current changing line 101 with a relatively low drop rate. When the inductor current is reduced to Vzx at time t0 (e.g., Vzx is a zero-crossing detection threshold voltage of the zero-crossing comparator), because of a time delay that can occur in the zero-crossing comparator, the inductor current may be reduced to zero at time t1 after delay time td.

However, when output voltage Vout is relatively large, the inductor current may be shown as current changing line 102 with a relatively high drop rate. In this case, the inductor current may be further reduced during the same time delay td. As a result, the inductor current can be reduced to a negative value, which can affect circuit efficiency under a light-load condition. When the converter operates under a light-load mode/condition, the zero-crossing detection circuit can detect current variation of a synchronous rectifier switch, and the circuit may self-adaptively adjust the zero-crossing point. In this way, the synchronous rectifier switch can be controlled to be turned off at the zero-crossing point. This approach can improve operation efficiency and stability of the switching power supply under light-load conditions.

In one embodiment, a method of detecting an inductor current zero-crossing in a switching power supply, can include: (i) determining a present output voltage of the switching power supply; (ii) generating a zero-crossing detection threshold voltage according to the output voltage; and (iii) generating a zero-crossing detection signal according to the zero-crossing detection threshold voltage, where the zero-crossing detection signal may be used to turn off a synchronous rectifier switch in the switching power supply.

Figure 2:
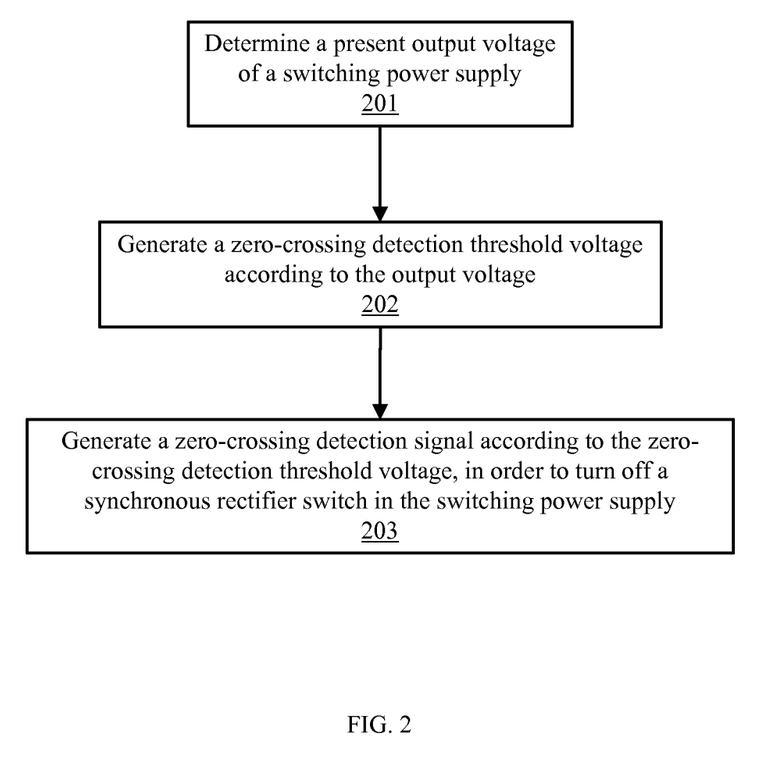
FIG. 2 is a flow diagram of an example inductor current zero-crossing detection method applied in a switching power supply, in accordance with embodiments of the present invention.

Referring now to FIG. 2, shown is a flow diagram of an example inductor current zero-crossing detection method applied in a switching power supply, in accordance with embodiments of the present invention. At step 201, a present output voltage of a switching power supply can be determined. For example, present output voltage Vout of the switching power supply can be directly obtained at an output voltage terminal of the switching power supply. In another example, present output voltage Vout can be determined according to input voltage Vin of the switching power supply, and duty cycle D of a pulse-width modulation (PWM) signal. This latter example may be applicable to cases in which the switching power supply does not have output voltage pins for external, or other suitable connections.

A buck converter is a voltage step down and current step up converter. The basic operation of a buck converter includes the current in an inductor being controlled by two switches, such as a transistor and a diode, or two transistors. A boost converter (step-up converter) is a DC-to-DC power converter with an output voltage that is greater than its input voltage. Both of these circuit/converters are types of a switching or switched-mode power supply (SMPS). Also, filters including capacitors can be added to the output of the converter to reduce output voltage ripple.

Figure 7:
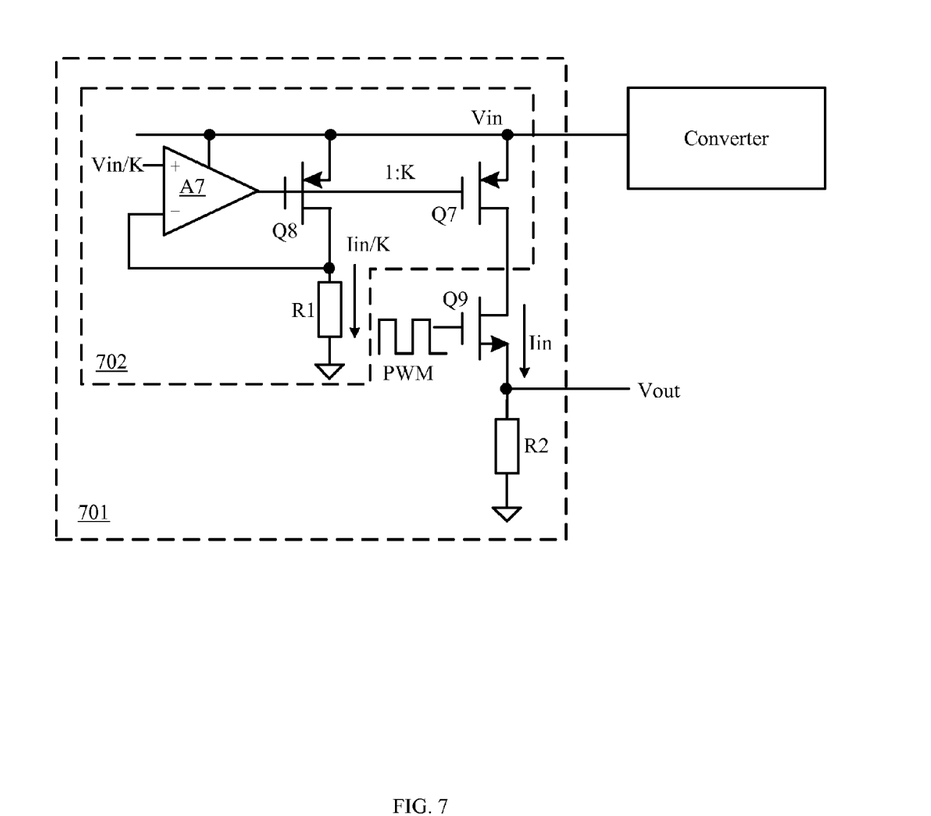
FIG. 7 is a schematic block diagram of an example output voltage sampling circuit, in accordance with embodiments of the present invention.

In a buck converter circuit, output voltage Vout can be determined according to input voltage Vin and duty cycle D of the PWM signal. For example, output voltage Vout can be equal to a product of input voltage Vin and duty cycle D (Vout=D*Vin), and FIG. 7 shows one example implementation. At 202, a zero-crossing detection threshold voltage can be generated according to the output voltage. For example, zero-crossing detection threshold voltage Vzx' may self-adaptively change or vary along with output voltage Vout. In other approaches, zero-crossing detection threshold voltage Vzx' may remain constant regardless of output voltage Vout. For example, when output voltage Vout is less than or equal to predetermined minimum output voltage Vout-min, zero-crossing detection threshold voltage Vzx' can be generated with a predetermined fixed value. Also for example, when output voltage Vout is greater than minimum output voltage Vout-min, zero-crossing detection threshold voltage Vzx' can be generated to vary along with output voltage Vout.

In some cases, zero-crossing detection threshold voltage Vzx' can meet formula (1) below, where V(Vout) is a function of output voltage Vout.

$$V_{zx'} = \begin{cases} V_{zxo}, & \text{Vout} \leq \text{Vout-min} \\ V(\text{Vout}), & \text{Vout} > \text{Vout-min} \end{cases} \quad (1)$$

In a buck circuit example, when output voltage Vout is greater than minimum output voltage Vout-min, zero-crossing detection threshold voltage Vzx' can increase along with output voltage Vout.

In one embodiment, an inductor current zero-crossing detection circuit configured in a switching power supply, can include: (i) an output voltage sampling circuit configured to determine a present output voltage of the switching power supply; (ii) a zero-crossing detection threshold voltage generating circuit configured to generate a zero-crossing detection threshold voltage according to the output voltage; and (iii) a zero-crossing detection circuit configured to generate a zero-crossing detection signal according to the zero-crossing detection threshold voltage, where the zero-crossing detection signal is used to turn off a synchronous rectifier switch in the switching power supply.

Figure 3:
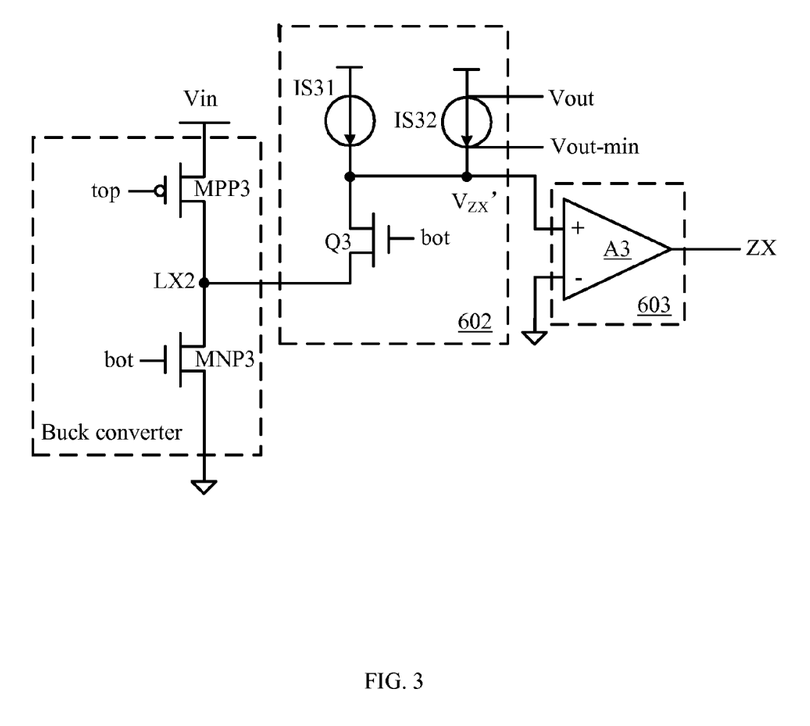
FIG. 3 is a schematic block diagram of an example zero-crossing detection in a buck circuit, in accordance with embodiments of the present invention.

Referring now to FIG. 3, shown is a schematic block diagram of an example zero-crossing detection in a buck circuit, in accordance with embodiments of the present invention. This particular buck circuit can include top transistor MPP3 and bottom transistor MNP3 of a main power switch. Switch Q3 can connect between node LX2 of top transistor MPP3 and bottom transistor MNP3, and a non-inverting input terminal of zero-crossing comparator A3 (e.g., any suitable comparator). Also, a control terminal of switch Q3 can receive the same PWM control signal ("bot") as bottom transistor MNP3.

An inverting input terminal of zero-crossing comparator A3 can connect to ground, and zero-crossing detection threshold voltage Vzx' may be provided to the non-inverting input terminal of zero-crossing comparator A3. In this example, zero-crossing detection threshold voltage Vzx' can be: $V_{zx'}=V_{LX}+R_{Msen}*(I1+I2)$, where $V_{LX}$ is a voltage at node LX2, $R_{Msen}$ is an equivalent resistor of switch Q3, I1 is a constant current of constant current source IS31 provided to the non-inverting input terminal, and I2 is a current of voltage controlled current source IS32 also provided to the non-inverting input terminal and that may increase along with output voltage Vout.

For example, voltage controlled current source IS32 may be a current source controlled by a voltage drop between output voltage Vout and predetermined minimum output voltage Vout-min. When output voltage Vout equals minimum output voltage Vout-min, zero-crossing detection threshold voltage Vzx' may be a constant value as determined by constant current I1 output by constant current source IS31. When output voltage Vout is greater than minimum output voltage Vout-min, zero-crossing detection threshold voltage Vzx' may be determined by constant current I1 output by constant current source IS31 and variable current I2 output by voltage controlled current source IS32. Because variable current I2 may be also determined by output voltage Vout, zero-crossing detection threshold voltage Vzx' can be self-adaptively adjusted according to output voltage Vout.

Referring back to FIG. 2, at 203, a zero-crossing detection signal can be generated by zero-crossing detection according to the zero-crossing detection threshold voltage, and may be used for turning off the switching power supply. In the buck circuit example, zero-crossing comparator A3 can compare zero-crossing detection threshold voltage Vzx' against a zero voltage (e.g., ground), and may output zero-crossing detection signal ZX. Zero-crossing detection signal ZX may be provided to a control circuit of the switching power supply in order to turn off the synchronous rectifier switch (e.g., transistor) at the zero-crossing point.

In this particular buck circuit, zero-crossing detection signal ZX going high may indicate that the inductor current is in a zero-crossing state. In response to an activated (e.g., high level) zero-crossing detection signal ZX, the control circuit can turn off bottom transistor MNP3 to prevent the inductor current from going negative. In this example, zero-crossing detection threshold voltage Vzx' provided to zero-crossing comparator A3 can determine whether inductor current iL is crossing zero, and may be self-adaptively adjusted along with the output voltage, as opposed being a constant value regardless of the output voltage. In this way, the inductor current can be prevented from being negative at or near the zero-crossing point.

Figure 4:
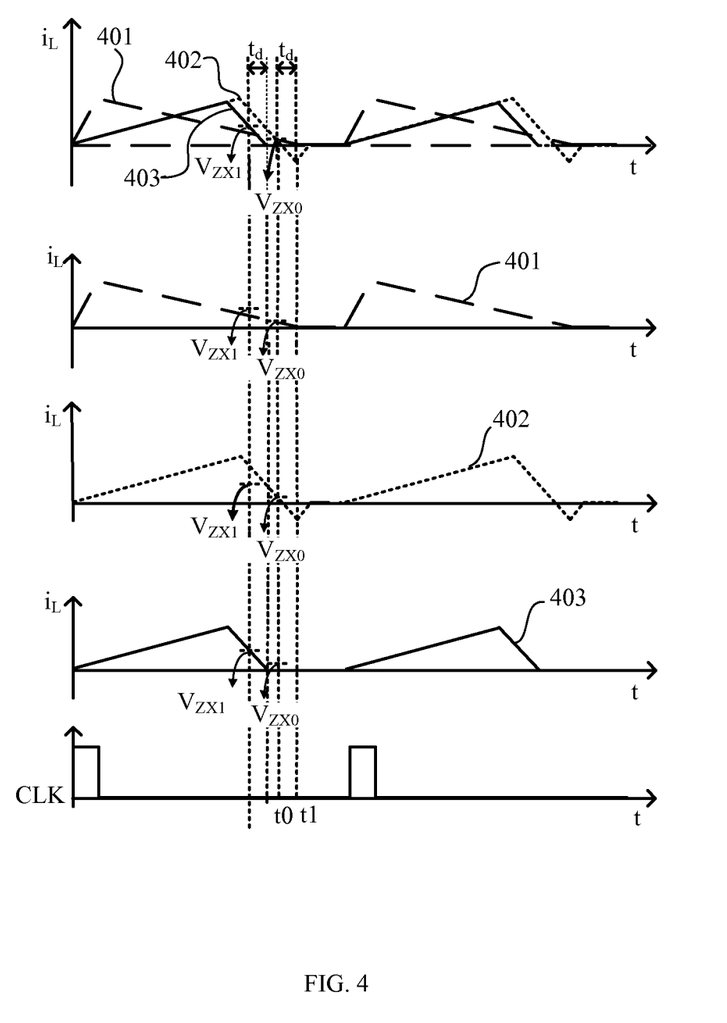
FIG. 4 is a diagram of example inductor currents of a switching power supply that change over time, in accordance with embodiments of the present invention.

Referring now to FIG. 4, shown is a diagram of example inductor currents of a switching power supply that change over time, in accordance with embodiments of the present invention. In a buck circuit example, when output voltage Vout is relatively low, inductor current iL may be shown as current changing line 401 with a relatively low drop rate. When inductor current iL is reduced to zero-crossing detection threshold voltage $V_{ZX0}$ at time t0, because of a time delay that may occur in zero-crossing comparator A3, inductor current iL can be reduced to zero at time t1 after delay time td.

When output voltage Vout is relatively large, inductor current iL may be shown as current changing line 402 with a relatively high drop rate before zero-crossing compensation. Thus, inductor current iL may be further reduced during the same delay time td. For example, inductor current iL may be reduced to be less than zero during delay time td, and even to be a negative if zero-crossing detection threshold voltage Vzx' remains $V_{ZX0}$, which can thereby affect circuit efficiency. In this particular example, zero-crossing detection threshold voltage Vzx' may increase along with output voltage Vout. When inductor current iL has a relatively high drop rate, zero-crossing detection threshold voltage Vzx' may be increased to be $V_{ZX1}$ for zero-crossing compensation. This can avoid negative current that may occur without zero-crossing compensation, thereby obtaining inductor current iL with zero-crossing compensation, shown as current changing line 403.

Figure 5:
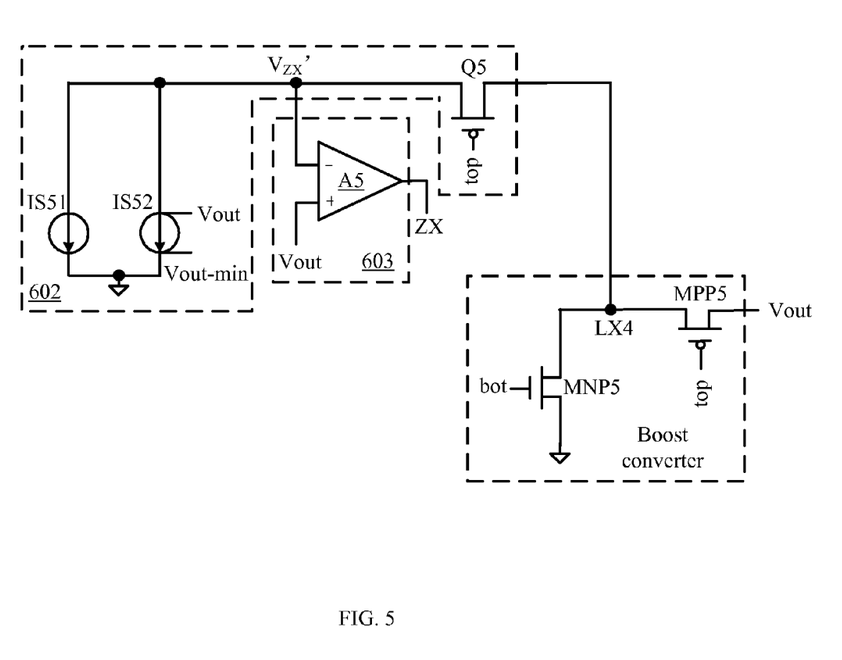
FIG. 5 is a schematic block diagram of an example zero-crossing detection in a boost circuit, in accordance with embodiments of the present invention.

In a boost circuit example, when output voltage Vout is greater than minimum output voltage Vout-min, zero-crossing detection threshold voltage Vzx' can decrease when output voltage Vout is increasing. Referring now to FIG. 5, shown is a schematic block diagram of an example zero-crossing detection in a boost circuit, in accordance with embodiments of the present invention. This example boost circuit can include top transistor MPP5 and bottom transistor MNP5 of a main power switch. Switch Q5 can connect between node LX4 of top transistor MPP5 and bottom transistor MNP5 and an inductor, and the inverting input terminal of zero-crossing comparator A5. A control terminal of switch Q5 can receive the same PWM control signal ("top") as top transistor MPP5. A non-inverting input terminal of zero-crossing comparator A5 can receive output voltage Vout. The inverting input terminal of zero-crossing comparator A5 can receive zero-crossing detection threshold voltage Vzx'. Zero-crossing comparator A5 can compare zero-crossing detection threshold voltage Vzx' against output voltage Vout, and may output zero-crossing detection signal ZX.

In this example, zero-crossing detection threshold voltage Vzx' can be: $V_{ZX}'=V_{LX}-R_{Msen}*(I1+I2)$, where $V_{LX}$ is a voltage at node LX4, $R_{Msen}$ is an equivalent resistor of transistor Q5, I1 is a constant current generated by constant current source IS51, and I2 is a variable current generated by voltage controlled current source IS52. Both the current directions of currents I1 and I2 are from the inverting input terminal of zero-crossing comparator A5 to ground. Also, variable current I2 can increase along with the output voltage, and generated zero-crossing detection threshold voltage $V_{ZX}'$ can decrease when output voltage Vout is increasing.

Similarly, in the boost circuit, voltage controlled current source IS52 is a current source controlled by a voltage drop between output voltage Vout and predetermined minimum output voltage Vout-min. When output voltage Vout equals a level of minimum output voltage Vout-min, zero-crossing detection threshold voltage Vzx' may be a constant value determined by constant current I1 output by constant current source IS31. When output voltage Vout is greater than minimum output voltage Vout-min, zero-crossing detection threshold voltage Vzx' may be determined by constant current I1 output by constant current source IS31 and variable current I2 output by voltage controlled current source IS32. Because variable current I2 may also be determined by output voltage Vout, zero-crossing detection threshold voltage Vzx' can be self-adaptively adjusted according to output voltage Vout.

In a boost circuit example, zero-crossing comparator A5 may be used to compare zero-crossing detection threshold voltage Vzx' against output voltage Vout, and to output zero-crossing detection signal ZX. Zero-crossing detection signal ZX may be provided to a control circuit of the switching power supply for turning off the synchronous rectifier switch at the zero-crossing point. In this particular boost circuit, zero-crossing detection signal ZX active high can indicate that the inductor current is in the zero-crossing state. In response to the activated (e.g., high level) zero-crossing detection signal ZX, the control circuit can turn off the top transistor in order to prevent the inductor current from being negative.

In particular embodiments, zero-crossing detection threshold voltage Vzx' may not be limited to a linear relationship with output voltage Vout. Rather, zero-crossing detection threshold voltage Vzx' may be self-adaptively changed with output voltage Vout. Also, when the output voltage is relatively high, zero-crossing detection threshold voltage Vzx' may be self-adaptively adjusted to realize zero-crossing compensation.

Figure 6:
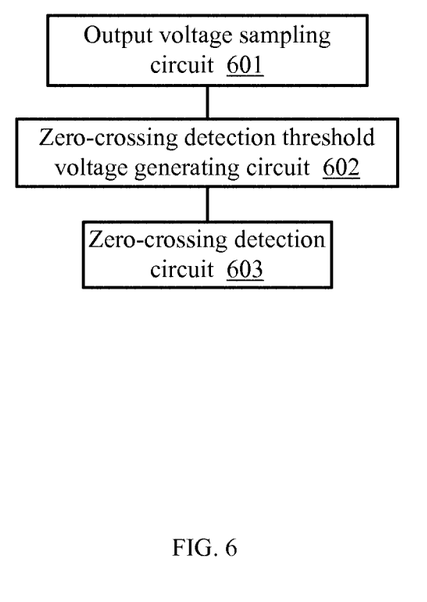
FIG. 6 is a schematic block diagram of an example inductor current zero-crossing detection circuit, in accordance with embodiments of the present invention.

Referring now to FIG. 6, shown is a schematic block diagram of an example inductor current zero-crossing detection circuit, in accordance with embodiments of the present invention. This particular example can include output voltage sampling circuit 601, zero-crossing detection threshold voltage generating circuit 602, and zero-crossing detection circuit 603. Zero-crossing detection threshold voltage generating circuit 602 may have an input terminal coupled to an output terminal of output voltage sampling circuit 601, and an output terminal coupled to an input terminal of zero-crossing detection circuit 603.

Zero-crossing detection threshold voltage generating circuit 602 can generate zero-crossing detection threshold voltage Vzx' according to a present output voltage of the switching power supply, as determined by output voltage sampling circuit 601. For example, zero-crossing detection threshold voltage Vzx' may self-adaptively change along with output voltage Vout. This is as opposed to other approaches where a zero-crossing detection threshold voltage Vzx' might remain constant regardless of a value of output voltage Vout.

When output voltage Vout is less than or equal to predetermined minimum output voltage Vout-min, zero-crossing detection threshold voltage generating circuit 602 can generate a zero-crossing detection threshold voltage with a predetermined constant value (e.g., Vzx'=Vzxo). When output voltage Vout is greater than or equal to predetermined minimum output voltage Vout-min, zero-crossing detection threshold voltage generating circuit 602 can generate a zero-crossing detection threshold voltage that varies along with output voltage Vout (e.g., Vzx'=V(Vout)).

Zero-crossing detection threshold voltage generating circuit 602 can provide zero-crossing detection threshold voltage Vzx' to zero-crossing detection circuit 603. Zero-crossing detection circuit 603 can perform zero-crossing detection according to zero-crossing detection threshold voltage Vzx', and may generate zero-crossing detection signal ZX. The control circuit can turn off the synchronous rectifier switch of the switching power supply at the zero-crossing point according to zero-crossing detection signal ZX.

Referring back to FIG. 3, as applied in a buck circuit, zero-crossing comparator A3 may be implemented as zero-crossing detection circuit 603. Zero-crossing detection threshold voltage generating circuit 602 can include switch Q3, constant current source IS31, and a voltage controlled current source. Zero-crossing detection threshold voltage Vzx' can be: $V_{ZX}'=V_{LX}+R_{Msen}*(I1+I2)$. Referring back to FIG. 5, as applied in a boost circuit, zero-crossing comparator A6 may be implemented as zero-crossing detection circuit 603. Zero-crossing detection threshold voltage generating circuit 602 can include switch Q5, constant current source IS51 and a voltage controlled current source. Zero-crossing detection threshold voltage Vzx' can be: $V_{ZX}'=V_{LX}-R_{Msen}*(I1+I2)$. Both of voltage controlled current source IS32 and voltage controlled current source IS52 may be utilized as current sources controlled by a voltage drop between output voltage Vout and minimum output voltage Vout-min.

Referring now to FIG. 7, shown is a schematic block diagram of an example output voltage sampling circuit, in accordance with embodiments of the present invention. This particular circuit structure can be suitable for switching power supplies without output voltage pins. Output voltage sampling circuit 701 can include input current generating circuit 702, switch Q9 (e.g., N-type MOS transistor), and sampling resistor R2. Input current generating circuit 702 can connect to a voltage input terminal of the switching power supply (e.g., a buck converter, a boost converter, etc.). Also, an output terminal of input current generating circuit 702 can receive input current Iin.

Input current generating circuit 702 can include amplifier A7, switch Q8, resistor R1, and switch Q7. Voltage Vin/K may be provided to the non-inverting input terminal of amplifier A7. Current Iin/K may flow through resistor R1 to obtain input current Iin at an output terminal of a current mirror circuit (e.g., drain of switch Q7) after passing the mirror circuit including switches Q7 and Q8. The output terminal of the mirror circuit can connect to drain D of switch Q9, and source S of switch Q9 can connect to a first terminal of sampling resistor R2. A second terminal of sampling resistor R2 can connect to ground, and gate G of switch Q9 can receive a PWM signal used to control the switching power supply. For example, the resistances of sampling resistor R2 and resistor R1 may be R, and an area ratio of switch Q8 and switch Q7 may be 1:K.

With output voltage sampling circuit 701 and this example, output voltage Vout can be determined according to input voltage Vin, as shown below in equation (2).

$$Iin = \frac{Vin}{R} \quad (2)$$

Because Vout=Iin*D*R, equation (2) can be converted to equation (3), as below.

$$Vout = Iin \times D \times R = \frac{Vin}{R} \times D \times R = D \times Vin \quad (3)$$

Therefore, by applying output voltage sampling circuit 701, output voltage Vout may equal a product of the duty cycle (D) of the PWM signal and input voltage Vin. Also, for switching power supplies with output voltage pins, the output voltage can be directly obtained at the output voltage pin through a voltage divider.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of detecting an inductor current zero-crossing in a switching power supply, the method comprising:
   a) determining a present output voltage of said switching power supply;
   b) generating a zero-crossing detection threshold voltage with a predetermined fixed value when said output voltage is less than or equal to a predetermined minimum output voltage; and
   c) generating a zero-crossing detection signal according to said zero-crossing detection threshold voltage, wherein said zero-crossing detection signal is used to turn off a synchronous rectifier switch in said switching power supply, wherein said zero-crossing detection threshold voltage is generated to vary with said output voltage when said output voltage is greater than said predetermined minimum output voltage.

2. The method of claim 1, wherein said generating said zero-crossing detection threshold voltage to vary with said output voltage comprises generating said zero-crossing detection threshold voltage in a linear relationship with said output voltage.

3. The method of claim 1, wherein said generating said zero-crossing detection threshold voltage to vary with said output voltage comprises generating said zero-crossing detection threshold voltage to increase with said output voltage.

4. The method of claim 3, wherein said generating said zero-crossing detection signal according to said zero-crossing detection threshold voltage comprises comparing said zero-crossing detection threshold voltage against a zero voltage.

5. The method of claim 1, wherein said generating said zero-crossing detection threshold voltage to vary with said output voltage comprises generating said zero-crossing detection threshold voltage to decrease when said output voltage is increasing.

6. The method of claim 5, wherein said generating said zero-crossing detection signal according to said zero-crossing detection threshold voltage comprises comparing said zero-crossing detection threshold voltage against said output voltage.

7. A method of detecting an inductor current zero-crossing in a switching power supply, the method comprising:
 a) determining a present output voltage of said switching power supply according to a present input voltage of said switching power supply and a duty cycle of a pulse-width modulation (PWM) signal, wherein said output voltage is equal to a product of said input voltage and said duty cycle;
 b) generating a zero-crossing detection threshold voltage according to said output voltage; and
 c) generating a zero-crossing detection signal according to said zero-crossing detection threshold voltage, wherein said zero-crossing detection signal is used to turn off a synchronous rectifier switch in said switching power supply.

8. An inductor current zero-crossing detection circuit configured in a switching power supply, the circuit comprising:
 a) an output voltage sampling circuit configured to determine a present output voltage of said switching power supply;
 b) a zero-crossing detection threshold voltage generating circuit configured to generate a zero-crossing detection threshold voltage with a predetermined fixed value when said output voltage is less than or equal to a predetermined minimum output voltage; and
 c) a zero-crossing detection circuit configured to generate a zero-crossing detection signal according to said zero-crossing detection threshold voltage, wherein said zero-crossing detection signal is used to turn off a synchronous rectifier switch in said switching power supply, and wherein said zero-crossing detection threshold voltage is generated to vary with said output voltage when said output voltage is greater than said predetermined minimum output voltage.

9. The circuit of claim 8, wherein said zero-crossing detection threshold voltage varies with said output voltage by a linear relationship with said output voltage.

10. The circuit of claim 8, wherein said zero-crossing detection threshold voltage varies with said output voltage by increasing with said output voltage.

11. The circuit of claim 10, further comprising:
 a) a zero-crossing comparator having a first input terminal coupled to an output terminal of said zero-crossing detection threshold voltage generating circuit, and a second input terminal coupled to ground;
 b) a first voltage controlled current source configured to provide a variable current that increases along with said output voltage when said output voltage is greater than said minimum output voltage;
 c) a first constant current source and said first voltage controlled current source being coupled to said first input terminal; and
 d) a first switch coupled between a first node and said first input terminal, wherein said first switch is controllable by a pulse-width modulation (PWM) signal, and wherein a main power switch and an inductor of said switching power supply are coupled at said first node.

12. The circuit of claim 8, wherein said zero-crossing detection threshold voltage varies with said output voltage by decreasing when said output voltage increases.

13. The circuit of claim 12, further comprising:
 a) a zero-crossing comparator having a second input terminal coupled to an output terminal of said zero-crossing detection threshold voltage generating circuit, and a first input terminal coupled to an output terminal of said switching power supply;
 b) a second voltage controlled current source configured to provide a variable current that increases along with said output voltage when said output voltage is greater than said minimum output voltage;
 c) a second constant current source and said second voltage controlled current source being coupled to said second input terminal; and
 d) a second switch coupled between a first node and a second input terminal of said zero-crossing comparator, wherein said second switch is controllable by said PWM signal, and wherein a main power switch and an inductor of said switching power supply are coupled at said first node.

14. An inductor current zero-crossing detection circuit configured in a switching power supply, the circuit comprising:
 a) an output voltage sampling circuit configured to determine a present output voltage of said switching power supply;
 b) a zero-crossing detection threshold voltage generating circuit configured to generate a zero-crossing detection threshold voltage according to said output voltage;
 c) a zero-crossing detection circuit configured to generate a zero-crossing detection signal according to said zero-crossing detection threshold voltage, wherein said zero-crossing detection signal is used to turn off a synchronous rectifier switch in said switching power supply;
 d) an input current generating circuit having an input terminal coupled to a voltage input terminal of said switching power supply, and an output terminal coupled to a first terminal of a third switch; and
 e) a sampling resistor having a first terminal coupled to a second terminal of said third switch, and a second terminal of said sampling resistor being coupled to ground, wherein said third switch is controllable by said PWM signal.

15. A switching power supply, comprising:
 a) said inductor current zero-crossing detection circuit of claim 8; and
 b) a power converter.

* * * * *